(12) United States Patent
Federle

(10) Patent No.: US 7,861,518 B2
(45) Date of Patent: Jan. 4, 2011

(54) SYSTEM AND METHOD FOR NOX REDUCTION OPTIMIZATION

(75) Inventor: Ken R. Federle, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1314 days.

(21) Appl. No.: 11/334,735

(22) Filed: Jan. 19, 2006

(65) Prior Publication Data

US 2007/0163244 A1 Jul. 19, 2007

(51) Int. Cl.
*F01N 3/00* (2006.01)

(52) U.S. Cl. .............................. 60/286; 60/274; 60/277; 701/123

(58) Field of Classification Search .................. 60/274, 60/277, 285, 286; 701/123
See application file for complete search history.

(56) References Cited

U.S. PATENT DOCUMENTS

| | | | |
|---|---|---|---|
| 4,063,072 A | 12/1977 | Sochtig et al. | |
| 4,926,331 A | 5/1990 | Windle et al. | |
| 5,280,756 A | 1/1994 | Labbe | |
| 5,788,936 A | 8/1998 | Subramanian et al. | |
| 5,842,341 A | 12/1998 | Kibe | |
| 5,924,280 A | 7/1999 | Tarabulski | |
| 5,968,464 A | 10/1999 | Peter-Hoblyn et al. | |
| 6,119,448 A | 9/2000 | Emmerling et al. | |
| 6,151,547 A | 11/2000 | Kumar et al. | |
| 6,343,468 B1 | 2/2002 | Doelling et al. | |
| 6,352,490 B1 | 3/2002 | Makki et al. | |
| 6,438,944 B1 * | 8/2002 | Bidner et al. | 60/274 |
| 6,487,849 B1 * | 12/2002 | Bidner et al. | 60/274 |
| 6,487,850 B1 * | 12/2002 | Bidner et al. | 60/285 |
| 6,553,301 B1 * | 4/2003 | Chhaya et al. | 701/54 |
| 6,662,553 B2 | 12/2003 | Patchett et al. | |
| 6,742,330 B2 | 6/2004 | Genderen | |
| 6,813,884 B2 | 11/2004 | Shigapov et al. | |
| 6,868,294 B2 | 3/2005 | Kouno et al. | |
| 6,895,747 B2 | 5/2005 | Upadhyay et al. | |
| 7,530,220 B2 * | 5/2009 | Miller et al. | 60/274 |
| 2003/0200022 A1 | 10/2003 | Streichsbier et al. | |
| 2004/0128982 A1 | 7/2004 | Patchett et al. | |
| 2005/0056004 A1 | 3/2005 | Kakwani et al. | |

OTHER PUBLICATIONS

International Search Report, PCT/US07/001480, Sep. 16, 2008.

* cited by examiner

*Primary Examiner*—Tu M Nguyen
(74) *Attorney, Agent, or Firm*—Studebaker & Brackett PC; Tim L. Brackett, Jr.; J. Bruce Schelkopf

(57) ABSTRACT

An engine controller determines the cost of operating a combustion engine and the cost of operating an emissions after-treatment device. Accordingly, the engine controller adjusts parameters for operation of the engine and the after-treatment device to ensure cost-effective use of the engine and the after-treatment device while complying with exhaust emissions requirements. In particular, the engine controller receives the price of fuel consumed by the engine and the price of reductant used by the after-treatment device to determine the respective cost of operation. Specifically, the fuel is diesel fuel used in a diesel engine; the reductant is urea use in a urea-based Selective Catalytic Reduction (SCR) system; and the regulated exhaust emissions is nitrogen oxide (NOx) emissions. The engine operating parameters may include cooled exhaust gas recirculation airflow, fuel injection timing, fuel injection pressure, and air-to-fuel ratio. The SCR system operating parameters may include the volume of urea injected.

29 Claims, 6 Drawing Sheets

SYSTEM AND METHOD FOR NOX REDUCTION OPTIMIZATION

BACKGROUND OF INVENTION

1. Technical Field

The present system and method relate generally to the reduction of pollutants from emissions released by automotive engines, and more particularly to the optimization of reduction of pollutants in exhaust emissions where parameters for operation of the engine and an after-treatment device are adjusted according to the cost of operation.

2. Description of the Related Art

Due to very high thermal efficiencies, the diesel engine offers good fuel economy and low emissions of hydrocarbons (HC) and carbon monoxide (CO). Despite these benefits, more efficient operation of diesel engines results in higher emissions of nitrogen oxides, i.e., NO or $NO_2$, known collectively as NOx. In diesel engines, the air-fuel mixture in the combustion chamber is compressed to an extremely high pressure, causing the temperature to increase until the fuel's auto-ignition temperature is reached. The air-to-fuel ratio for diesel engines is much leaner (more air per unit of fuel) than for gasoline engines, and the larger amount of air promotes more complete fuel combustion and better fuel efficiency. As a result, emissions of hydrocarbons and carbon monoxide are lower for diesel engines than for gasoline engines. However, with the higher pressures and temperatures in the diesel engine, NOx emissions tend to be higher, because the high temperatures cause the oxygen and nitrogen in the intake air to combine as nitrogen oxides.

NOx emissions from diesel engines pose a number of health and environmental concerns. Once in the atmosphere, NOx reacts with volatile organic compounds or hydrocarbons in the presence of sunlight to form ozone, leading to smog formation. Ozone is corrosive and contributes to many pulmonary function problems, for instance.

Due to the damaging effects, governmental agencies have imposed increasingly stringent restrictions for NOx emissions. Two mechanisms can be implemented to comply with emission control regulations: manipulation of engine operating characteristics and implementation of after-treatment control technologies.

In general, manipulating engine operating characteristics to lower NOx emissions can be accomplished by lowering the intake temperature, reducing power output, retarding the injector timing, reducing the coolant temperature, and/or reducing the combustion temperature.

For example, cooled exhaust gas recirculation (EGR) is well known and is the method that most engine manufacturers are using to meet environmental regulations. When an engine uses EGR, a percentage of the exhaust gases are drawn or forced back into the intake and mixed with the fresh air and fuel that enters the combustion chamber. The air from the EGR lowers the peak flame temperatures inside the combustion chamber. Intake air dilution causes most of the NOx reduction by decreasing the $O_2$ concentration in the combustion process. To a smaller degree, the air also absorbs some heat, further cooling the process.

In addition to EGR, designing electronic controls and improving fuel injectors to deliver fuel at the best combination of injection pressure, injection timing, and spray location allows the engine to burn fuel efficiently without causing temperature spikes that increase NOx emissions. For instance, controlling the timing of the start of injection of fuel into the cylinders impacts emissions as well as fuel efficiency. Advancing the start of injection, so that fuel is injected when the piston is further away from top dead center (TDC), results in higher in-cylinder pressure and higher fuel efficiency, but also results in higher NOx emissions. On the other hand, retarding the start of injection delays combustion, but lowers NOx emissions. Due to the delayed injection, most of the fuel is combusted at lower peak temperatures, reducing NOx formation.

Engine control modules (ECM's), also known as engine control units (ECU's), control the engine and other functions in the vehicle. ECM's can receive a variety of inputs to determine how to control the engine and other functions in the vehicle. With regard to NOx reduction, the ECM can manipulate the parameters of engine operation, such as EGR and fuel injection.

Reducing NOx by manipulating engine operation generally reduces fuel efficiency. Moreover, the mere manipulation of engine operation may not sufficiently reduce the amount of NOx to mandated levels. As a result, after-treatment systems also need to be implemented. In general, catalysts are used to treat engine exhaust and convert pollutants, such as carbon monoxide, hydrocarbons, as well as NOx, into harmless gases. In particular, to reduce NOx emissions, diesel engines on automotive vehicles can employ a catalytic system known as a urea-based Selective Catalytic Reduction (SCR) system. Fuel efficiency benefits of 3 to 10% can result from using SCR systems to reduce NOx rather than manipulating engine operation for NOx reduction which negatively impacts fuel efficiency. Urea-based SCR systems can be viewed according to four major subsystems: the injection subsystem that introduces urea into the exhaust stream, the urea vaporization and mixing subsystem, the exhaust pipe subsystem, and the catalyst subsystem. Several SCR catalysts are available for diesel engines, including platinum, vanadium, and zeolite.

ECM's can also control the operating parameters of catalytic converters, such as urea injection in an SCR system. For instance, the ECM can meter urea solution into the exhaust stream at a rate calculated from an algorithm which estimates the amount of NOx present in the exhaust stream as a function of engine operating conditions, e.g. vehicle speed and load.

The diesel vehicle must carry a supply of urea solution for the SCR system, typically 32.5% urea in water by weight. The urea solution is pumped from the tank and sprayed through an atomizing nozzle into the exhaust gas stream. Complete mixing of urea with exhaust gases and uniform flow distribution are critical in achieving high NOx reductions.

Urea-based SCR systems use gaseous ammonia to reduce NOx. During thermolysis, the heat of the gas breaks the urea ($CO(NH_2)_2$) down into ammonia ($NH_3$) and hydrocyanic acid (HCNO). The ammonia and the HCNO then meet the SCR catalyst where the ammonia is absorbed and the HCNO is further decomposed through hydrolysis into ammonia. When the ammonia is absorbed, it reacts with the NOx to produce water, oxygen gas ($O_2$), and nitrogen gas ($N_2$). The amount of ammonia injected into the exhaust stream is a critical operating parameter. The required ratio of ammonia to NOx is typically stoichiometric. The ratio of ammonia to NOx must be maintained to assure high levels of NOx reduction. However, the SCR system can never achieve 100% NOx reduction due to imperfect mixing, etc. In addition, too much ammonia cannot be present. Ammonia that is not reacted will slip through the SCR catalyst bed and exhaust to the atmosphere. Ammonia slip is a regulated parameter which may not exceed a fixed concentration in the SCR exhaust.

Urea-based SCR catalysts can be very effective in reducing the amount of NOx released into the air and meeting stringent emissions requirements. However, the use of urea-based SCR is met with infrastructure and distribution considerations. As described above, diesel vehicles employing urea-based SCR generally carry a supply of aqueous solution of urea, so a urea distribution system is required to allow vehicles to replenish their supplies of urea. The United States currently has no automotive urea infrastructure. The cost of urea is likely to be volatile in the U.S. even as the first pieces of an infrastructure are put in place, because the development of the urea infrastructure is likely to be slow.

In areas, such as Europe, where the price of diesel fuel is generally much higher than the expected price of urea, the SCR system can use as much urea as necessary to reduce NOx and achieve maximum fuel economy during combustion in the engine, notwithstanding any problems with urea distribution. In contrast, the use of urea in the U.S. will probably be more measured, because the price of urea will be closer to the price of diesel. Moreover, the problems with urea distribution and pricing are coupled with fluctuations in diesel fuel prices.

SUMMARY OF THE INVENTION

As discussed previously, reducing the content of NOx in exhaust emissions by controlling aspects of engine operation, such as EGR or fuel injection, generally reduces fuel efficiency, because these methods attempt to lower the temperature at combustion to prevent the formation of NOx. This is disadvantageous when the price of fuel is very high and a premium is placed on fuel efficiency. On the other hand, reducing NOx emissions by increasing the use of a urea-based SCR system, requires more urea, and this is disadvantageous when the price of urea is very high. Because the prior art does not dynamically adjust the use of fuel and reductants, such as urea, to achieve cost-effective operation of the vehicle, the present invention is a system and method that determines the optimal operating parameters for an engine and an emissions after-treatment device according to the cost of operating the engine and the emissions after-treatment device.

An embodiment of the invention employs a combustion engine which produces exhaust emissions after combustion of fuel according to engine operating parameters, an exhaust after-treatment device which acts on the exhaust emissions according to after-treatment parameters, and an engine controller, such as an ECM, which controls the engine and the after-treatment device. The engine controller determines a cost to operate the engine and a cost to operate the after-treatment device. The engine controller then adjusts the engine operating parameters and/or the after-treatment parameters, at least partially based on a comparison of the cost to operate the engine with the cost to operate the after-treatment device. The engine controller may also adjust the engine operating parameters and/or the after-treatment parameters based on emissions requirements which specify limits on parts of the overall system exhaust.

The engine controller may receive the price of fuel and the price of reductant as inputs. Moreover, the engine controller may receive data from sensors in the engine and the after-treatment system in order to calculate fuel consumption and urea consumption. The engine controller can then determine the costs of operating the engine and the after-treatment device through an algorithm which combines the price inputs and the consumption calculations to derive the cost of fuel consumption and urea consumption.

In an exemplary embodiment, the engine is a diesel engine and the after-treatment device is a urea-based SCR system using urea as a reductant to reduce NOx emissions. When the cost of fuel consumption is higher than urea consumption, the engine controller changes operating parameters in favor of using the SCR system to reduce NOx and to maintain a high combustion temperature for higher fuel efficiency. When the cost of urea consumption is higher than the cost of fuel consumption, the engine-controller changes operating parameters in favor of using the engine to reduce the use of urea while sacrificing some fuel efficiency. While the present invention may be discussed particularly in terms of implementing an ECM and a urea-based SCR system to reduce NOx exhaust emissions, the present invention contemplates any after-treatment device for reducing any component of exhaust emissions. The embodiments described here are examples to provide a better understanding of the present invention.

If the cost of operating the engine is less than the cost to operate the after-treatment device, the engine controller may adjust the engine operating parameters and/or the after-treatment parameters by retarding the fuel injector timing, decreasing the air-to-fuel ratio, decreasing the fuel injection pressure, increasing the cooled exhaust gas recirculation airflow, and/or decreasing from the reductant injection volume. On the other hand, if the cost of operating the engine is greater than the cost to operate the after-treatment device, the engine controller may adjust the engine operating parameters and/or after-treatment parameters by advancing the fuel injector timing, increasing the air-to-fuel ratio, increasing the fuel injection pressure, decreasing the cooled exhaust gas recirculation airflow, and/or increasing the reductant injection volume. However, the present invention contemplates any means for controlling parameters for the operation of the engine and the after-treatment device.

In many cases, the engine controller must also ensure that the supply of reductant, such as urea, is not completely depleted. Thus, in another embodiment, the engine controller monitors the level of reductant in the reductant supply and reduces reductant usage when the level falls below a critical threshold. In yet another embodiment, the engine controller determines an optimal rate of reductant usage, which represents the greatest rate of reductant consumption that will allow the vehicle to travel a certain number of miles starting with a specific amount of reductant without depleting the supply. The optimal rate of reductant usage can be calculated from input data such as the number of route miles to be driven and the starting supply of reductant. Thus, the engine controller can ensure that its output signals to the after-treatment device do not require the after-treatment device to use more than this optimal rate of reductant usage.

DETAILED DESCRIPTION OF THE INVENTION

Engine controllers, such as ECM's, currently do not account for the monetary cost of operating the engine and the monetary cost of operating an after-treatment system. More specifically, price inputs for fuel and reductants, such as urea, are not currently specified for ECM algorithms. As a result, no ECM's, or the vehicles that use them, are able to dynamically adjust the use of fuel and reductants, such as urea, to achieve cost-effective operation of the vehicle while complying with emissions regulations.

The following presents a detailed description of a system and method that determines the optimal operating parameters for an engine and an emissions after-treatment device according to the cost of operating the engine and the after-treatment device. To demonstrate the features of the present invention, the present invention is discussed in terms of an exemplary embodiment implementing an ECM to reduce total NOx exhaust emissions from a diesel engine by determining appropriate operating parameters for engine components and for a urea-based SCR system according to the price of diesel fuel and the price of urea. However, this preferred embodiment is not meant to limit the present invention.

Figure 1:
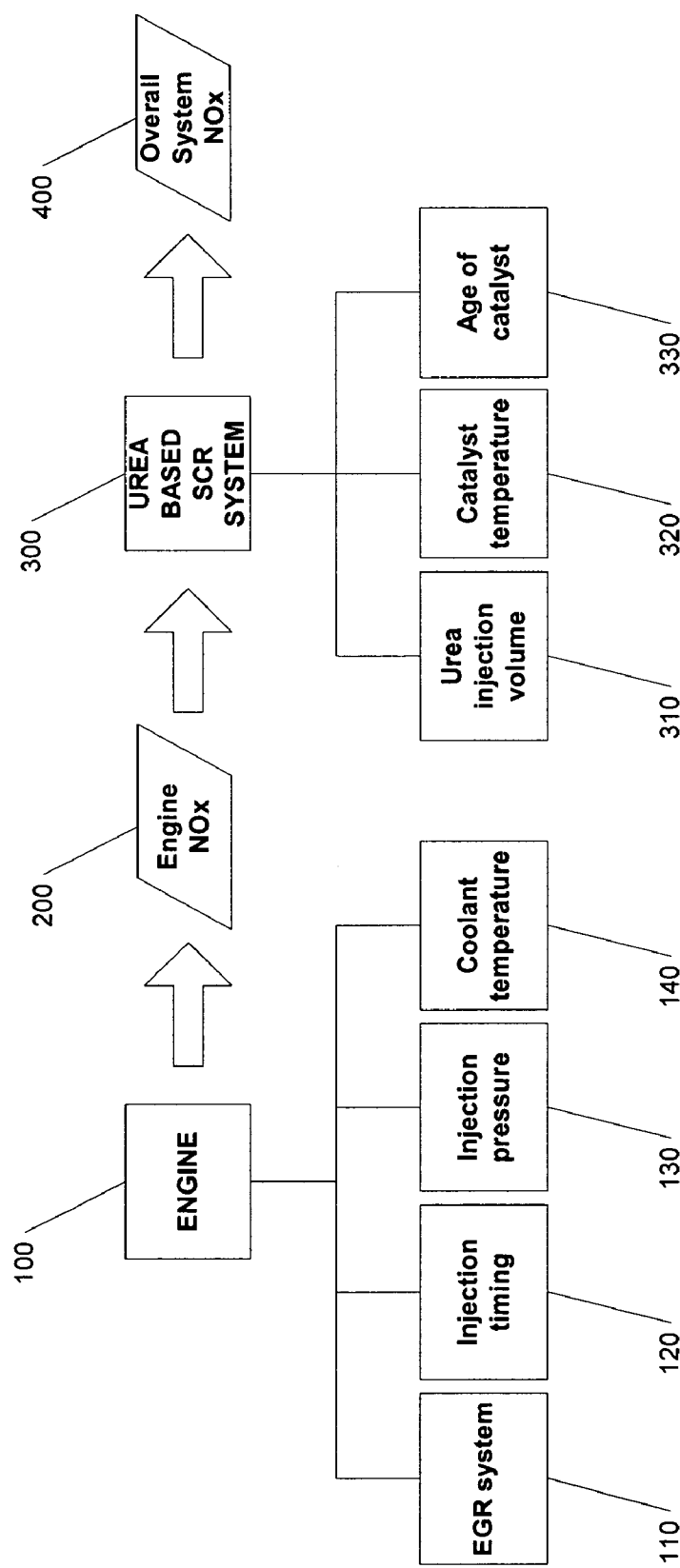
FIG. 1 provides a chart illustrating how the overall system NOx is created according to various characteristics of the engine and a urea-based SCR system.

Referring to FIG. 1 of the accompanying drawings, overall system NOx 400 represents the amount of total NOx exhaust emissions from the entire vehicle, which must fall at or below mandated environmental regulations. Engine NOx 200 represents the NOx exhaust emissions from the operation of the engine 100. The overall system NOx 400 also represents the NOx exhaust emissions that result after the engine NOx 200 passes through the urea-based SCR system 300.

Various characteristics of the engine 100 which can affect the amount of engine NOx 200 include, but are not limited to, the EGR system 110, the injection timing 120, the injection pressure 130, and the coolant temperature 140. These engine attributes are merely representative of the different ways that the engine NOx 200 can be controlled and are provided only as an illustration of how the present invention may be implemented. Moreover, the engine in the present invention generally covers all aspects of the vehicle, not just those related to fuel delivery and combustion, that occur before emissions are exhausted to the after-treatment device, which in turn specifically acts to reduce the pollutants in the emissions.

Various characteristics of the urea-based SCR system 300 which can affect the level of reduction of NOx in the engine NOx 200 include, but are not limited to, the urea injection volume 310, the catalyst temperature 320, and the age of the catalyst 330. These SCR system attributes are merely representative of how the operation of the SCR system 300 can be influenced and are provided only as an illustration of how the present invention may be implemented.

Thus, as summarized in FIG. 1, the operation of engine 100 produces the engine NOx 200, and the amount of engine NOx 200 depends on various characteristics of the engine 100. The engine NOx 200 is then introduced into the SCR system 300 which reduces the amount of NOx in the engine NOx 200 according to the various characteristics of the SCR system 300. The final amount of NOx emissions is the overall system NOx 400.

Figure 2:
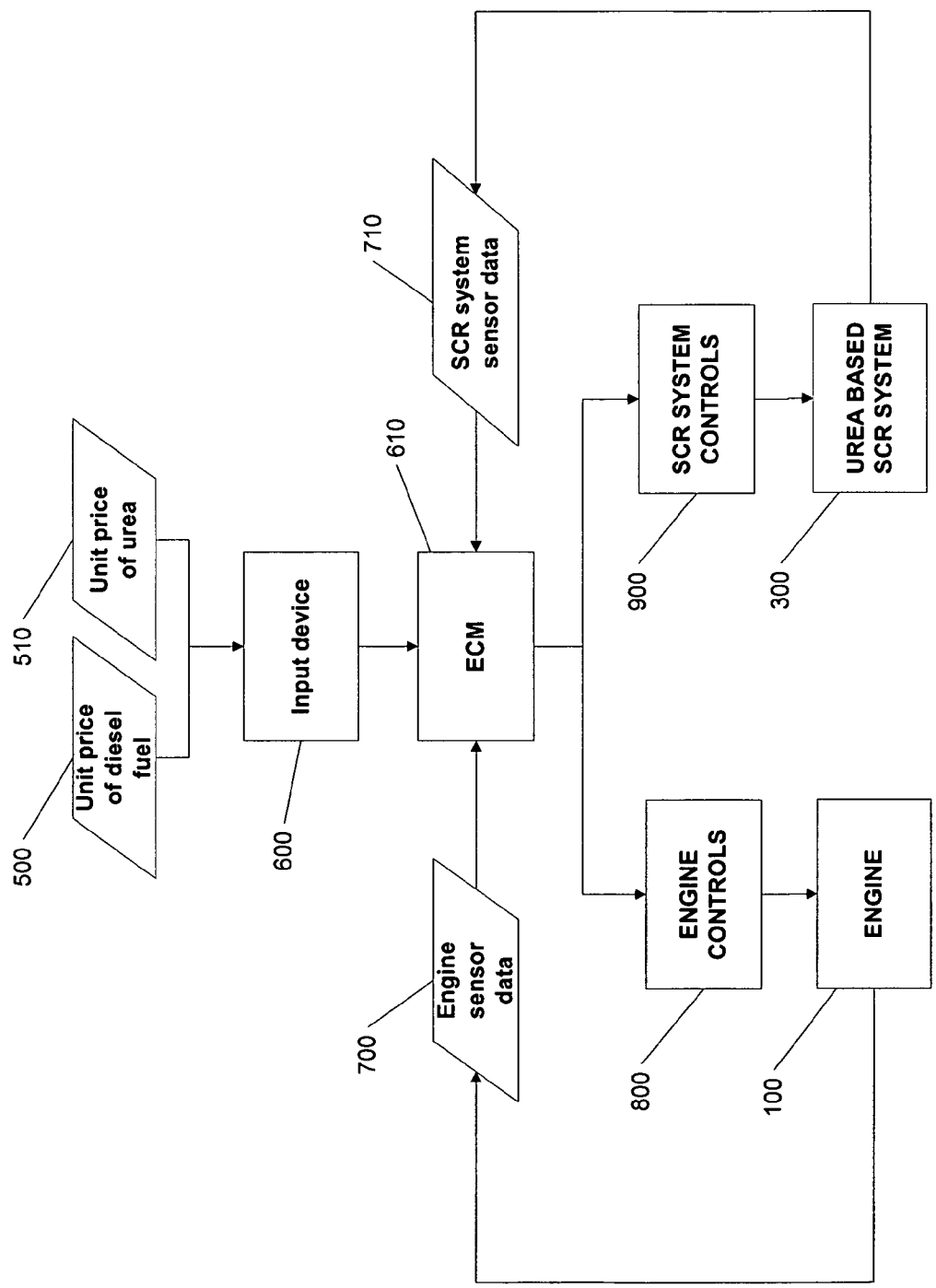
FIG. 2 provides a chart illustrating an exemplary embodiment with the data that are input into an ECM and how output signals are directed.

As shown in the exemplary embodiment of FIG. 2, an ECM 610 is employed for the present invention. The ECM 610 can be one or more microprocessors and other associated components, such as memory devices which store data and program instructions. The ECM 610 generally receives input signals from various sensors throughout the vehicle as well as possible external input data from end users. The ECM 610 then reads the program instructions and executes the instructions to perform data monitoring, logging, and control functions in accordance with the input signals and external input data. The ECM 610 sends control data to an output port which relays output signals to a variety of actuators controlling the engine or the SCR system, generally depicted by the engine controls 800 and the SCR system controls 900. In general, the present invention can be implemented with most commercially available ECM's and no changes to the ECM will be required. Although this exemplary embodiment includes an ECM, any system of controlling operation of engine components and after-treatment devices according to specified instructions may be employed to implement the present invention.

According to the exemplary embodiment of the present invention, the end user or some input mechanism transmits the unit price of diesel fuel 500 and the unit price of urea 510 as input parameters into the ECM 610 through the input device 600. The input device 600 may include, but is not limited to, a computer, personal digital assistant (PDA), or other entry device with a data link connected physically, wirelessly, or by any data transmission method, to the ECM 610. Moreover, the input device 600 may include an automated system or network which transmits data to the ECM 610. Automatic updates are particularly advantageous where the unit price of diesel fuel 500 and the unit price of urea 510 may change frequently. If no input parameters are entered, the ECM can use default settings that reflect the most likely prices for diesel fuel and urea.

After receiving the unit price of diesel fuel 500 and the unit price of urea 510, the ECM 610 determines whether it is more cost-effective to increase NOx reduction with the engine 100 or with the SCR system 300. The engine sensor data 700 from the engine 100 and the SCR system sensor data 710 from the SCR system 300 provide additional input for the ECM 610 to determine optimal operating parameters and to allow the system to change the parameters dynamically according to changing conditions. The engine sensor data 700 provides the ECM 610 with data, such as engine speed and load, required to calculate current fuel consumption, so that the ECM 610 can compute the current cost of fuel consumption using the unit price of diesel fuel 500. In addition, the SCR sensor data 710 provides the ECM 610 with data required to calculate current urea consumption, such as the amount of engine NOx 200, so that the ECM 610 can compute the current cost of urea consumption using the unit price of urea 510. Moreover, the ECM 610 receives data from a sensor in the SCR system outflow that indicates overall system NOx to ensure that the operating parameters are adjusted in compliance with environmental regulations. Based on the cost calculations, the ECM 610 then sends output signals to the engine controls 800 and the SCR system controls 900 directing how the engine 100 and the SCR system 300 should operate to optimize NOx reduction. As the engine sensor data 700 and the SCR system sensor data 710 change, the cost calculations may change requiring the ECM 610 to adjust its output signals.

Figure 3:
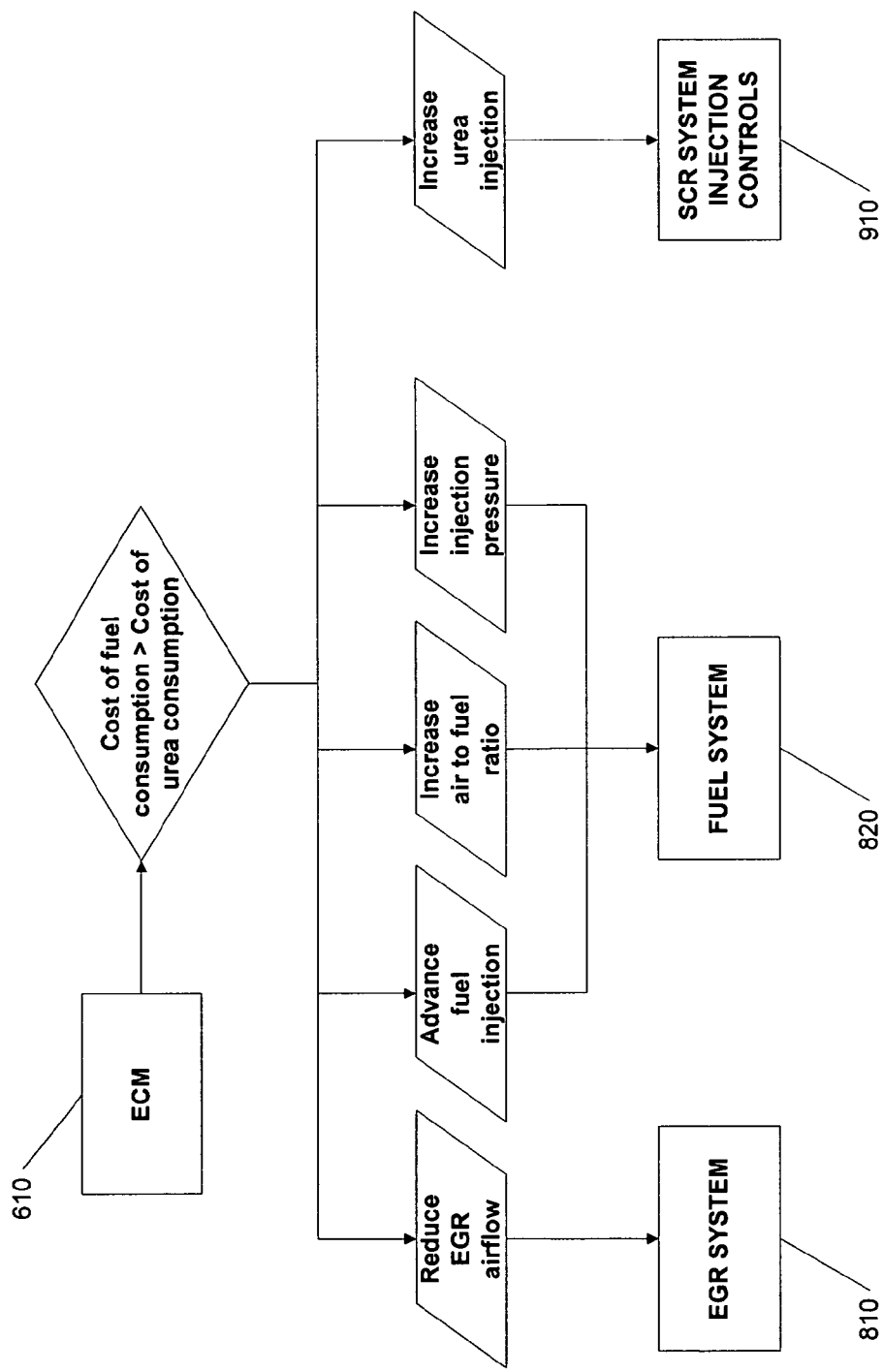
FIG. 3 provides a chart illustrating exemplary output signals from the ECM to maximize fuel efficiency when the cost of operating the engine is higher than the cost of operating the SCR system.

If the current cost of fuel consumption is higher than the current cost of urea consumption, the ECM 610 will attempt to maximize fuel efficiency by maintaining a high temperature at combustion. For example, as shown in FIG. 3, the ECM 610 can maximize fuel efficiency by reducing the flow of cooled exhaust air back into the combustion chamber. The ECM 610 monitors signals from sensors indicating the RPM of the turbocharger in EGR system 810 and sensors indicating engine speed and directs the EGR system 810 to adjust the airflow to increase fuel efficiency.

In addition, the ECM 610 can send signals to calibrate the fuel system 820 to maximize fuel efficiency. The ECM 610 can control the rate of fuel delivery and the timing of injection through actuators. The ECM 610 can also control the pressure at which the fuel is injected. Advancing the fuel injection, increasing the pressure of injection, and making the air-fuel mixture leaner can be controlled alone or in combination to effect an increase in fuel efficiency. An engine speed signal may be a necessary sensor input for the ECM 610 to properly regulate the fuel system 820.

Meanwhile, since the higher temperatures during combustion increase the engine NOx 200, the ECM 610 can direct the SCR system injection controls 910 to increase the amount of urea injected into the SCR system 300 to reduce overall system NOx 400 and ensure compliance with environmental regulations.

Figure 4:
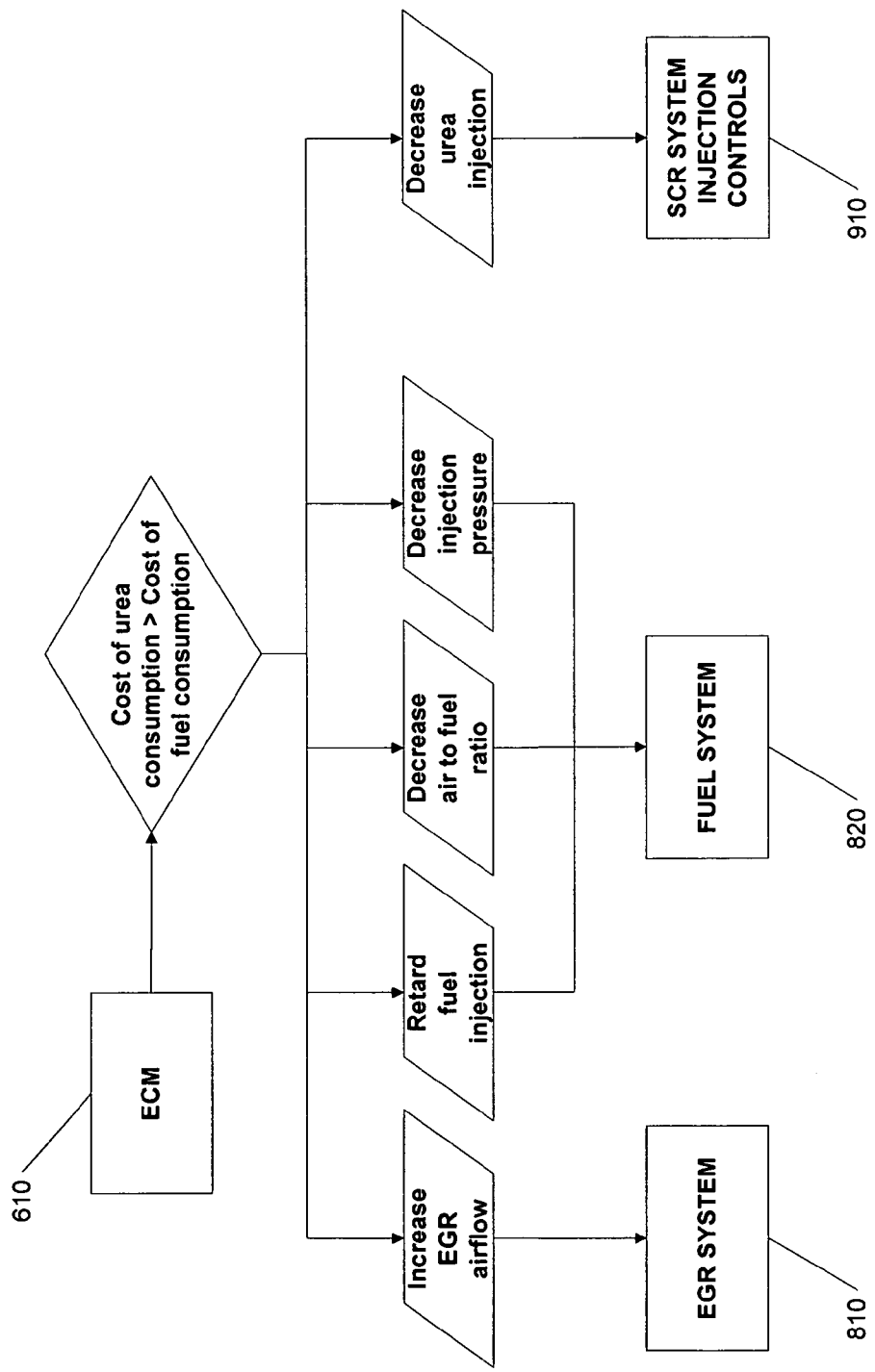
FIG. 4 provides a chart illustrating exemplary output signals from the ECM to minimize urea usage when the cost of operating the engine is lower than the cost of operating the SCR system.

On the other hand, if the current cost of urea consumption is higher than the current cost of fuel consumption, the ECM 610 will attempt to minimize the need for urea by lowering the temperature at combustion and reducing the engine NOx 200. For example, as shown in FIG. 4, the ECM 610 can minimize the engine NOx 200 by increasing the flow of cooled exhaust air back into the combustion chamber. The ECM 610 monitors signals from sensors indicating the RPM of the turbocharger in EGR system 810 and sensors indicating engine speed and directs the EGR system 810 to adjust the airflow to decrease the formation of NOx in the combustion chamber.

In addition, the ECM 610 can calibrate the fuel system 820 to minimize the need for urea. The ECM 610 can control the rate of fuel delivery and the timing of injection through actuators. The ECM 610 can also control the pressure at which the fuel is injected. Retarding the fuel injection, decreasing the pressure of injection, and making the air-fuel mixture less leaner all help to increase fuel efficiency. An engine speed signal may be a necessary sensor input for the ECM 610 to properly regulate the fuel system 820.

Since the lower temperatures during combustion minimize the engine NOx 200, the ECM 610 can direct the SCR system injection controls 910 to reduce the amount of urea injected into the SCR system 300 since less urea is needed to comply with environmental regulations. It is also understood, however, that urea usage likely cannot be completely avoided, since there may be limits to the amount that the engine NOx 200 can be reduced.

A sensor may also be required to monitor ammonia slip to make sure that too much urea is not being introduced and to ensure compliance with regulations governing ammonia slip.

FIGS. 3 and 4 are only exemplary in nature. Controlling the EGR system and the fuel system in the manner described above are only examples of how to affect the combustion temperature and thereby control the amount of NOx. There are also other ways of controlling the amount of urea needed in the SCR system. The examples provided are not intended to limit the methods by which combustion temperature or urea usage are controlled. Moreover, the ECM 610 does not have to adjust all the available operating parameters that affect fuel efficiency and NOx emissions. For instance, the ECM 610 may be able to increase fuel efficiency without having to increase urea usage if the SCR sensor data 710 indicates that the overall system NOx 400 will remain at or below mandated limits after the adjustment. Thus, the ECM 610 might only send signals to adjust engine controls 800. Similarly, if the overall system NOx 400 will remain at or below mandated limits, the ECM can send signals to the SCR system injection controls 910 to reduce the amount of urea injected into the SCR system 300 without having to reduce fuel efficiency.

Figure 5:
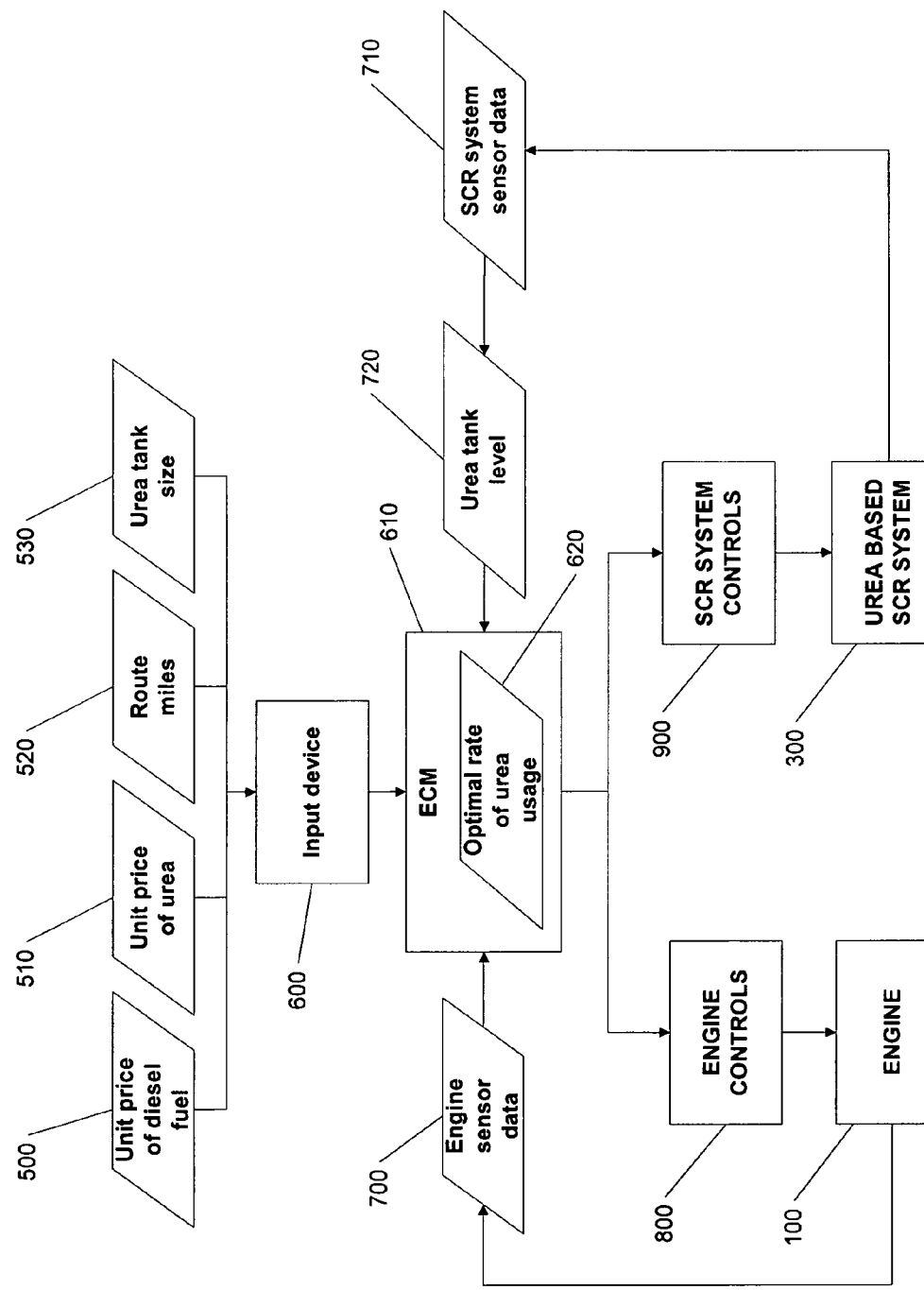
FIG. 5 provides a chart illustrating another embodiment of the present invention which utilizes additional input regarding the urea supply.

FIG. 5 illustrates an additional embodiment of the present invention where the route miles 520 and the starting supply of urea 530 may also be entered via input device 600 into ECM 610. The ECM 610 determines an optimal rate of urea usage 620 which represents the greatest rate of urea consumption that will allow the vehicle to travel the route miles 520 with the starting supply of urea 530 without completely depleting the supply. The ECM 610 can then prevent complete depletion of urea by ensuring that its output signals to the SCR system do not require the SCR system to use more urea than this optimal rate of urea usage 620. Preventing complete depletion eliminates the need to rely on an unreliable urea distribution infrastructure to refill urea tanks or to make unscheduled stops to replenish. Moreover, it is likely to be more cost-effective for fleets to utilize their own supplies of urea.

Figure 6:
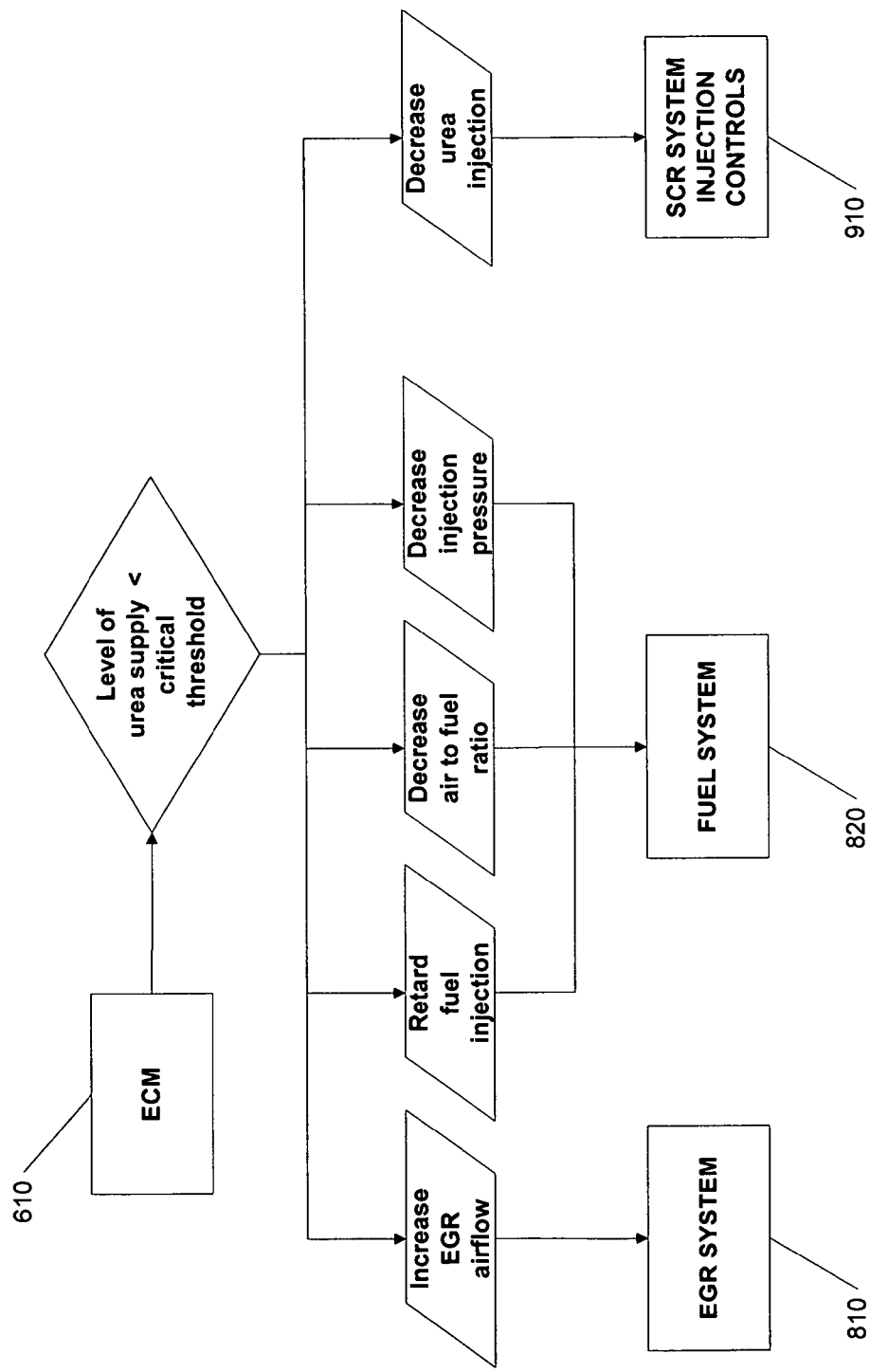
FIG. 6 provides a chart illustrating exemplary output signals from the ECM to minimize urea usage when the supply of urea usage drops below a critical threshold level.

Additionally, the ECM 610 can also receive sensor data regarding the level of urea in the tank 720 so that when the amount of available urea reaches a critical level, the ECM 610 minimizes urea consumption in order to prevent complete depletion, which may cause the engine to derate. If the urea level falls below a critical threshold level, the ECM 610 can reduce the use of urea and maintain a certain level of NOx emissions by adjusting the engine operating parameters and as depicted in FIG. 6. For example, the EGR airflow is increased, the fuel injection timing is retarded, the air-to-fuel ratio is decreased, and/or the fuel injection pressure is decreased, while the volume of urea injected by the SCR system is decreased. The actions illustrated in FIG. 6 can override the operating parameters that take the cost of fuel and urea into account. Indeed, reducing the use of urea according to the level of the urea supply or measuring urea usage according to an optimal rate of urea usage can be implemented without determining the costs of operating the engine or the SCR system.

It should be readily understood by those persons skilled in the art that the present invention is susceptible of broad utility and application. Many embodiments and adaptations of the present invention other than those herein described, as well as many variations, modifications and equivalent arrangements, will be apparent from, or reasonably suggested, by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for controlling exhaust emissions from a combustion engine, the method comprising:
   determining a cost to operate a combustion engine including receiving a fuel price and a cost to operate an after-treatment device including receiving a reductant price;
   comparing the cost to operate the combustion engine with the cost to operate the after-treatment device; and
   at least one of adjusting one or more engine operating parameters and adjusting one or more after-treatment parameters, at least partially based on the comparison of the cost to operate the engine with the cost to operate the after-treatment device, wherein the one or more engine operating parameters determine a first mixture of exhaust emissions after combustion of fuel by the combustion engine, said one or more engine operating parameters comprising at least one of a fuel injector timing, an air-to-fuel ratio, an injection pressure, and a cooled exhaust gas recirculation airflow, and wherein the one or more after-treatment parameters determine a second mixture of exhaust emissions converted from the first exhaust emissions by the exhaust after-treatment device including a selective catalytic reduction device adapted to inject a reductant into the first exhaust emissions, said one or more after-treatment parameters comprising a reductant injection volume.

2. The method for controlling exhaust emissions from a combustion engine according to claim 1, wherein the combustion engine is a diesel engine and the fuel is diesel fuel.

3. The method for controlling exhaust emissions from a combustion engine according to claim 1, wherein the step of determining the cost to operate the engine includes receiving a fuel price through a manual input device.

4. The method for controlling exhaust emissions from a combustion engine according to claim 1, wherein the step of determining the cost to operate the engine includes receiving a fuel price through an automated network.

5. The method for controlling exhaust emissions from a combustion engine according to claim 1, wherein the reductant is urea.

6. The method for controlling exhaust emissions from a combustion engine according to claim 1, wherein the step of determining the cost to operate the after-treatment device includes receiving a reductant price through a manual input device.

7. The method for controlling exhaust emissions from a combustion engine according to claim 1, wherein the step of determining the cost to operate the after-treatment device includes receiving a reductant price through an automated network.

8. The method for controlling exhaust emissions from a combustion engine according to claim 1, wherein if the cost of operating the engine is greater than the cost to operate the after-treatment device, the step of at least one of adjusting the one or more engine operating parameters and adjusting the one or more after-treatment parameters includes at least one of advancing the fuel injector timing, increasing the air-to-fuel ratio, increasing the fuel injection pressure, decreasing the cooled exhaust gas recirculation airflow, and increasing the reductant injection volume.

9. The method for controlling exhaust emissions from a combustion engine according to claim 1, wherein if the cost of operating the engine is less than the cost to operate the after-treatment device, the step of at least one of adjusting the one or more engine operating parameters and adjusting the one or more after-treatment parameters includes at least one of retarding the fuel injector timing, decreasing the air-to-fuel ratio, decreasing the fuel injection pressure, increasing the cooled exhaust gas recirculation airflow, and decreasing from the reductant injection volume.

10. The method for controlling exhaust emissions from a combustion engine according to claim 1, wherein the step of determining a cost to operate a combustion engine and a cost to operate an after-treatment device includes receiving sensor data from the engine and the after-treatment device.

11. The method for controlling exhaust emissions from a combustion engine according to claim 1, further comprising determining an optimal rate of reductant usage, and wherein the step of adjusting the one or more after-treatment parameters includes at least adjusting reductant usage to a rate not greater than the optimal rate of reductant usage.

12. The method for controlling exhaust emissions from a combustion engine according to claim 11, further comprising before the step of determining an optimal rate of reductant usage, receiving input data indicating a volume of available urea and a number of route miles to be driven using the engine.

13. The method for controlling exhaust emissions from a combustion engine according to claim 1, wherein the step of at least one of adjusting the one or more engine operating parameters and adjusting the one or more after-treatment parameters is based partially further on a limit for an amount of a part in the second mixture of exhaust emissions.

14. The method for controlling exhaust emissions from a combustion engine according to claim 13, wherein the part in the second mixture of exhaust emissions comprises nitrogen oxides.

15. A system for controlling exhaust emissions from a combustion engine, the system comprising:
a combustion engine adapted to produce a first mixture of exhaust emissions after combustion of fuel according to one or more engine operating parameters;
an exhaust after-treatment device including a selective catalytic reduction device adapted to convert the first exhaust emissions to a second mixture of exhaust emissions according to one or more after-treatment parameters, said selective catalytic reduction device adapted to inject a reductant into the first exhaust emissions; and
an engine controller adapted to control the engine and the after-treatment device,
wherein the engine controller receives a fuel price to determine a cost to operate the engine and receives a reductant price to determine a cost to operate the after-treatment device, compares the cost to operate the engine with the cost to operate the after-treatment device, and at least one of adjusts the one or more engine operating parameters and adjusts the one or more after-treatment parameters, at least partially based on the comparison of the cost to operate the engine with the cost to operate the after-treatment device, wherein the one or more engine operating parameters comprises at least one of a fuel injector timing, an air-to-fuel ratio, an injection pressure, and a cooled exhaust gas recirculation airflow, and the one or more after-treatment parameters comprises a reductant injection volume.

16. The system for controlling exhaust emissions from a combustion engine according to claim 15, wherein the engine is a diesel engine and the fuel is diesel fuel.

17. The system for controlling exhaust emissions from a combustion engine according to claim 15, wherein the reductant is urea.

18. The system for controlling exhaust emissions from a combustion engine according to claim 15, wherein the reductant price is entered into the engine controller through a manual input device.

19. The system for controlling exhaust emissions from a combustion engine according to claim 15, wherein the reductant price is entered into the engine controller through an automated network.

20. The system for controlling exhaust emissions from a combustion engine according to claim 15, wherein if the cost of operating the engine is greater than the cost to operate the after-treatment device, the engine controller at least one of adjusts the one or more engine operating parameters and adjusts the one or more after-treatment parameters by at least one of advancing the fuel injector timing, increasing the airto-fuel ratio, increasing the fuel injection pressure, decreasing the cooled exhaust gas recirculation airflow, and increasing the reductant injection volume.

21. The system for controlling exhaust emissions from a combustion engine according to claim 15, wherein if the cost of operating the engine is less than the cost to operate the after-treatment device, the engine controller at least one of adjusts the one or more engine operating parameters and adjusts the one or more after-treatment parameters by at least one of retarding the fuel injector timing, decreasing the air-to-fuel ratio, decreasing the fuel injection pressure, increasing the cooled exhaust gas recirculation airflow, and decreasing from the reductant injection volume.

22. The system for controlling exhaust emissions from a combustion engine according to claim 15, wherein the engine controller receives sensor data from the engine and the after-treatment device.

23. The system for controlling exhaust emissions from a combustion engine according to claim 15, wherein the engine controller further determines an optimal rate of reductant usage, and wherein the engine controller adjusts the one or more after-treatment parameters by at least adjusting reductant usage to a rate not greater than the optimal rate of reductant usage.

24. The system for controlling exhaust emissions from a combustion engine according to claim 23, wherein the engine controller receives input data indicating a volume of available urea and a number of route miles to be driven by the system.

25. The system for controlling exhaust emissions from a combustion engine according to claim 15, wherein the engine controller at least one of adjusts the one or more engine operating parameters and adjusts the one or more after-treatment parameters, based partially further on a limit for an amount of a part in the second mixture of exhaust emissions.

26. The system for controlling exhaust emissions from a combustion engine according to claim 25, wherein the part in the second mixture of exhaust emissions comprises nitrogen oxides.

27. The system for controlling exhaust emissions from a combustion engine according to claim 15, wherein the engine controller receives a fuel price to determine the cost to operate the engine.

28. The system for controlling exhaust emissions from a combustion engine according to claim 27, wherein the fuel price is entered into the engine controller through a manual input device.

29. The system for controlling exhaust emissions from a combustion engine according to claim 27, wherein the fuel price is entered into the engine controller through an automated network.

* * * * *